L. W. CHUBB.
COIL FOR ELECTRICAL APPARATUS.
APPLICATION FILED FEB. 16, 1912.

1,171,591.

Patented Feb. 15, 1916.

WITNESSES:
Fred H. Miller

INVENTOR
Lewis W. Chubb
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

COIL FOR ELECTRICAL APPARATUS.

1,171,591.

Specification of Letters Patent. Patented Feb. 15, 1916.

Application filed February 16, 1912. Serial No. 677,107.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Coils for Electrical Apparatus, of which the following is a specification.

My invention relates to coils for electrical apparatus and it has special reference to terminal members for coils composed of aluminum conductors and to processes of producing the same.

The object of my invention is to provide a particularly simple and durable terminal structure which may be readily produced on a commercial scale and which is especially adapted for use with coils of aluminum or other conducting material, such, for example, as steel, iron and tungsten, to which flexible leads and metal terminals cannot effectively and economically be soldered.

It is extremely difficult, if not impossible, to produce a satisfactory soldered joint between an aluminum wire or cable and a wire or cable of either aluminum or copper, but a satisfactory welded joint between aluminum wires or between an aluminum wire and a copper wire or between metal bodies formed of other like or unlike metals, may be produced by the process set forth in my United States Patent No. 1,066,468, granted July 8, 1913, and assigned to the Westinghouse Electric and Manufacturing Company.

According to my present invention, I provide an aluminum or other coil with a flexible copper lead, by welding a short section of copper wire to the extremity of the aluminum wire or other similar conductor of which the coil is composed, and then soldering a flexible lead to the free end of the copper wire in the usual manner.

The difficulty which is overcome by the use of my invention has been sufficiently serious to prohibit, or at least very much curtail, the use of aluminum conductors in the construction of coils for electric apparatus.

Figure 1:
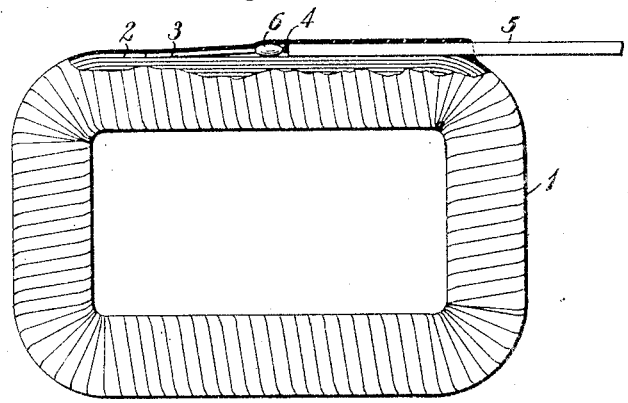
Figure 2:
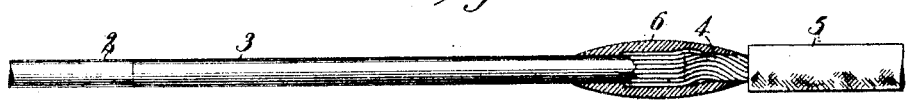
Figure 3:
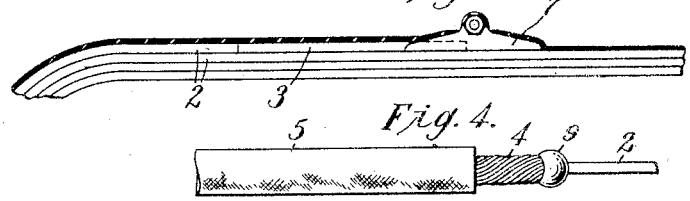
Figure 4:
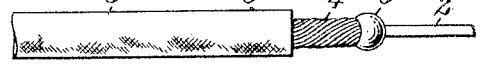

Figure 1 of the accompanying drawings is a plan view of a coil having a terminal structure embodying my invention, a portion of the insulation being broken away, and Fig. 2 is a partially sectional view, on a larger scale, of the terminal structure shown in Fig. 1. Fig. 3 is a sectional view, showing a portion of a coil having a modified terminal structure, and Figs. 4, 5 and 6 are detail views of still other terminal structures that embody my invention.

Referring to Figs. 1 and 2 of the drawings, the coil 1, which may be utilized as the field coil of a dynamo-electric machine or for any other suitable purpose, is composed of a plurality of turns of aluminum wire or other similar conducting material which cannot readily be soldered. To an end 2 of aluminum or other similar conductors, a short section 3 of copper wire or wire of some other conducting material which may readily be soldered, is welded. A flexible lead 4, which is preferably a multi-strand cable, as shown in Fig. 2, and is protected by an insulating covering 5, is secured to the free end of the section 3 by a well known soldered joint 6.

Figure 6:
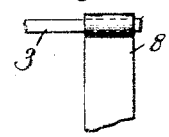

Instead of attaching a flexible lead, as indicated in Figs. 1 and 2, a terminal member 7 or a clip 8 may be soldered to the short conductor 3, as shown in Figs. 3 and 6, respectively.

Figure 5:
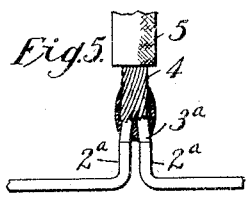

As shown in Fig. 5, an intermediate tap may be produced by welding a short section $3^a$ of copper or similar conducting material to the coil ends $2^a$, and soldering the flexible tap conductor 4 to the copper section $3^a$, which may or may not be folded or bent in any suitable manner.

While only one terminal of a coil is illustrated, it is equally important that both should be equipped with my terminal structure.

While my invention is primarily intended for use in connection with aluminum wire coils, it is not restricted in this regard and may be utilized with terminals of any other material to which solder will not readily adhere.

I claim as my invention:

1. A terminal structure comprising a conductor to which solder readily adheres, and a flexible lead soldered to one end of the conductor, the other end of said conductor being welded to a conductor to which solder can not readily be made to adhere.

2. The combination with a conducting wire which cannot readily be soldered, of a terminal structure comprising a short section of unlike conducting material welded to the end of said wire, and a flexible conducting lead soldered to said short section.

3. A terminal structure comprising a conductor to which solder does not readily adhere, a short section of conducting material to which solder readily adheres, the said short section being welded to the said conductor, and a terminal member soldered to the short section.

4. The combination with an aluminum wire, of a terminal structure comprising a section of solderable conducting material welded to one end of said wire and a terminal member soldered to the said section.

5. The combination with an aluminum wire, of a terminal structure comprising a copper conductor having one end welded to one end of said wire and a flexible terminal member soldered to the other end of the copper conductor.

In testimony whereof, I have hereunto subscribed my name this 8th day of Feb., 1912.

LEWIS W. CHUBB.

Witnesses:
O. W. A. OETTING,
B. B. HINES.